(12) United States Patent
Shinagawa (10) Patent No.: US 10,867,223 B2
(45) Date of Patent: Dec. 15, 2020

(54) IMAGE FORMING APPARATUS AND IMAGE FORMING METHOD

(71) Applicant: Oki Data Corporation, Tokyo (JP)

(72) Inventor: Kazuki Shinagawa, Tokyo (JP)

(73) Assignee: OKI DATA CORPORATION, Tokyo (JP)

( * ) Notice: Subject to any disclaimer, the term of this patent is extended or adjusted under 35 U.S.C. 154(b) by 0 days.

(21) Appl. No.: 16/514,329

(22) Filed: Jul. 17, 2019

(65) Prior Publication Data

US 2020/0074250 A1 Mar. 5, 2020

(30) Foreign Application Priority Data

Aug. 31, 2018 (JP) .................................. 2018-162352

(51) Int. Cl.
*G06K 15/02* (2006.01)
*H04N 1/387* (2006.01)
*H04N 1/393* (2006.01)

(52) U.S. Cl.
CPC ....... *G06K 15/1868* (2013.01); *G06K 15/024* (2013.01); *H04N 1/3872* (2013.01); *H04N 1/393* (2013.01)

(58) Field of Classification Search
CPC . G06K 15/024; H04N 1/3872; G03G 15/6567
See application file for complete search history.

(56) References Cited

U.S. PATENT DOCUMENTS

| | | | |
|---|---|---|---|
| 8,830,524 B2 * | 9/2014 | Takikawa | G03G 15/50 358/1.9 |
| 9,612,558 B1 | 4/2017 | Okabayashi | |
| 2007/0188588 A1 * | 8/2007 | Shimomura | H04N 1/506 347/233 |
| 2008/0056777 A1 * | 3/2008 | Osawa | G03G 15/0131 399/301 |
| 2011/0169906 A1 * | 7/2011 | Suzuki | B41J 2/473 347/224 |
| 2011/0194860 A1 * | 8/2011 | Peng | G03G 15/6567 399/15 |
| 2011/0311240 A1 * | 12/2011 | Shirakata | G03G 15/6567 399/16 |
| 2013/0049287 A1 * | 2/2013 | Ueda | B65H 9/002 271/110 |
| 2014/0153941 A1 * | 6/2014 | Miyazaki | G03G 15/0189 399/49 |
| 2016/0238979 A1 | 8/2016 | Ohshika | |
| 2016/0267362 A1 * | 9/2016 | Tanigawa | G06K 15/1868 |
| 2017/0075272 A1 * | 3/2017 | Kimura | G03G 21/20 |
| 2017/0227893 A1 * | 8/2017 | Miyazaki | G03G 15/1605 |
| 2018/0059602 A1 * | 3/2018 | Minato | G03G 15/162 |

FOREIGN PATENT DOCUMENTS

| JP | 2017-138548 A | 8/2017 |
|---|---|---|
| JP | 2017213775 A | 12/2017 |

* cited by examiner

*Primary Examiner* — Ted W Barnes
(74) *Attorney, Agent, or Firm* — Panitch Schwarze Belisario & Nadel LLP (57) ABSTRACT

An image forming apparatus includes a communication unit to acquire image forming data, generation units and to generate image data based on the image forming data, a correction unit to change an amount of correction to correct a shift of an image of the image data in forming the image in accordance with a ratio at which a developer is deposited by using the image data, and a printing unit to form the image corrected by the correction unit on a medium.

10 Claims, 6 Drawing Sheets

<PRINT DATA>
PRINT DENSITY: LOW (20%)

FIG. 6B

LOGICAL POSITION

FIG. 6C

NO CORRECTION

FIG. 7

IMAGE FORMING APPARATUS AND IMAGE FORMING METHOD

CROSS-REFERENCE TO RELATED APPLICATION

This application claims priority under 35 U.S.C. § 119(b) to Japanese Application No. 2018-162352, filed Aug. 31, 2018, the disclosure of which is incorporated by reference herein in its entirety.

BACKGROUND OF THE INVENTION

1. Field of the Invention

The present invention relates to an image forming apparatus and an image forming method.

2. Description of the Related Art

An image forming apparatus to form an image on roll paper or the like with an intermediate transfer method is conventionally available (see, for example, Japanese Patent Application Publication No. 2017-138548). The conventional image forming apparatus detects intervals of marks or gaps between pages by using a sensor or the like, calculates a correction value, in consideration of an image forming timing in the intermediate transfer method, by using the difference between a logical page length designated as print data and an actual page length detected by the sensor or the like, and applies the correction value to print on roll paper or the like.

The conventional image forming apparatus holds correction value of the intervals of the marks or the gaps in the previous printing in association with pieces of information concerning a medium size, a medium type, an environmental temperature, and an environmental humidity, reads out the held correction value, and makes corrections in the next printing, thereby being able to reduce the shift of the writing position due to, for example, the variance of each label even in the intermediate transfer method.

SUMMARY OF THE INVENTION

An image forming apparatus according to one aspect of the present invention includes an acquisition unit to acquire image forming data, a generation unit to generate image data, based on the image forming data, a correction unit to change an amount of correction to correct a shift of an image of the image data in forming the image, in accordance with a ratio at which a developer is deposited by using the image data, and an image forming unit to form the image corrected by the correction unit on a medium.

DETAILED DESCRIPTION OF THE INVENTION

Figure 1:
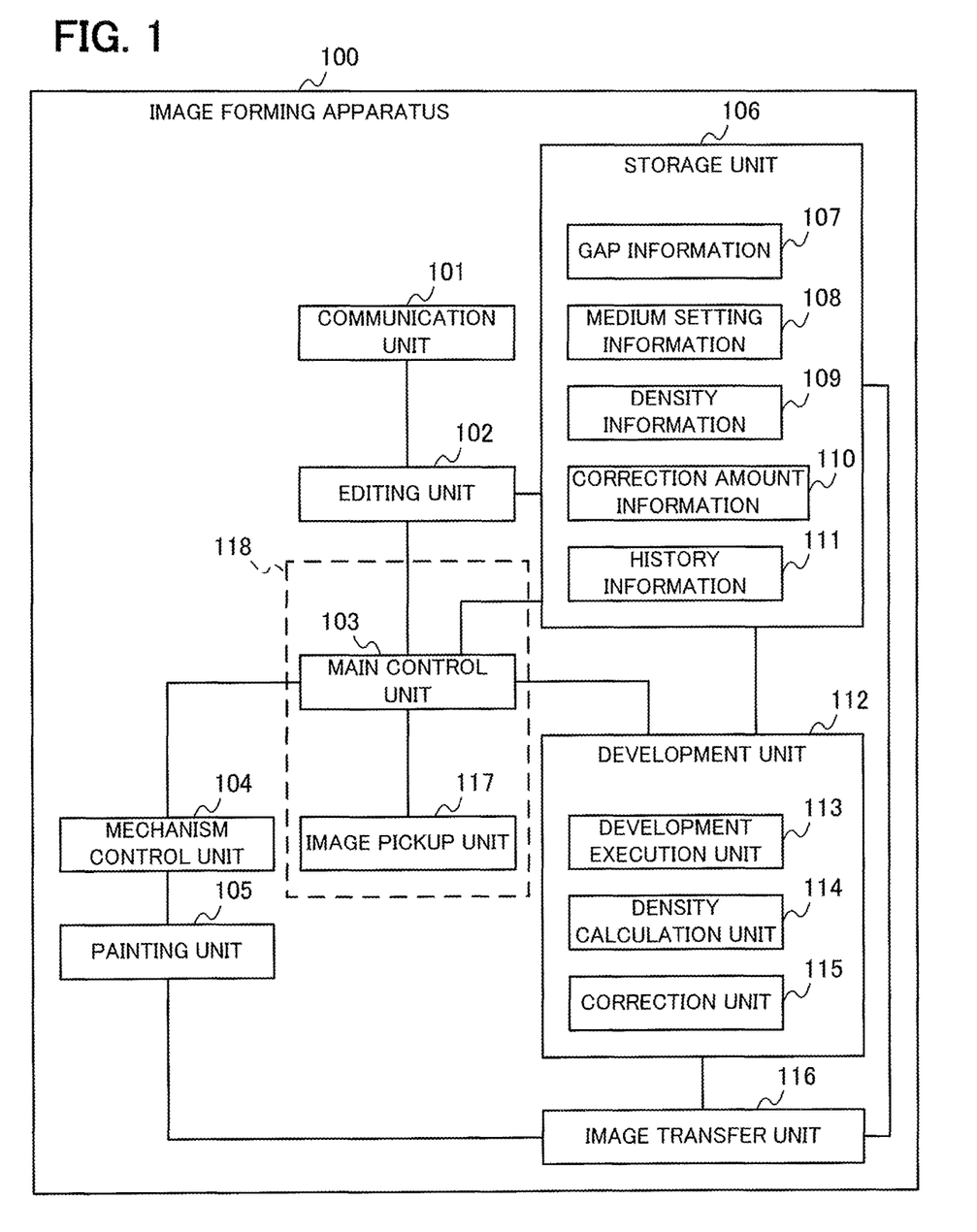
FIG. 1 is a block diagram schematically illustrating a configuration of an image forming apparatus according to an embodiment.

FIG. 1 is a block diagram schematically illustrating a configuration of an image forming apparatus 100 according to an embodiment.

The image forming apparatus 100 includes a communication unit 101, an editing unit 102, a main control unit 103, a mechanism control unit 104, a printing unit 105, a storage unit 106, a development unit 112, an image transfer unit 116, and an image pickup unit 117.

The communication unit 101 functions as an acquisition unit to acquire print data as image forming data representing an image to be formed. For example, the communication unit 101 communicates with a host device (information processing device), which is not illustrated, and receives the print data from the host device.

The communication unit 101 further acquires, from the host device, setting information representing attributes of a medium on which the image represented by the image forming data is to be formed. The attributes of a medium include, for example, the type, the thickness, the length, and the width of the medium. The setting information may also be acquired from, for example, a host application executed by the main control unit 103 of the image forming apparatus 100. The host application may accept input of the setting information from, for example, an input device (e.g., a touch panel), which is not illustrated, provided in the image forming apparatus 100.

The editing unit 102 edits the print data to generate edited print data (edited image forming data) representing an image in a printing unit (an image forming unit) per page.

The main control unit 103 controls the overall processing in the image forming apparatus 100. For example, the main control unit 103 controls the communication unit 101, the editing unit 102, the mechanism control unit 104, the printing unit 105, the storage unit 106, the development unit 112, the image transfer unit 116, and the image pickup unit 117.

The main control unit 103 acquires, from the image pickup unit 117, picked-up-image data obtained by picking up an image of the medium printed by the printing unit 105, and detects a shift amount of a printing shift from the picked-up-image data. For example, the main control unit 103 detects the difference (actual value) between the rear end position of the image formed on the medium and the rear end position of the medium, and detects the shift amount by comparing the detected difference with a difference (ideal value) between the rear end position of the image and the rear end position of the medium which are obtained from the print data.

The main control unit 103 calculates a total shift amount by adding the detected shift amount to an amount of correction used in printing. The main control unit 103 and the image pickup unit 117 function as a total shift calculation unit 118 to calculate a total shift amount.

The mechanism control unit 104 performs control associated with mechanisms to perform printing (image formation), which includes, for example, driving a motor to convey the medium, increasing the temperature of a fixing device (not illustrated) to fix a toner image (developer image) on the medium, and cutting the medium by a cutter mechanism 10 (to be described later).

The printing unit 105 functions as an image forming unit that includes a printhead (not illustrated) and forms an image on the medium (performs printing) in accordance with image data transferred from the image transfer unit 116. The printing unit 105 forms, on the medium, an image whose shift in formation on the medium is corrected by the development unit 112.

Figure 2:
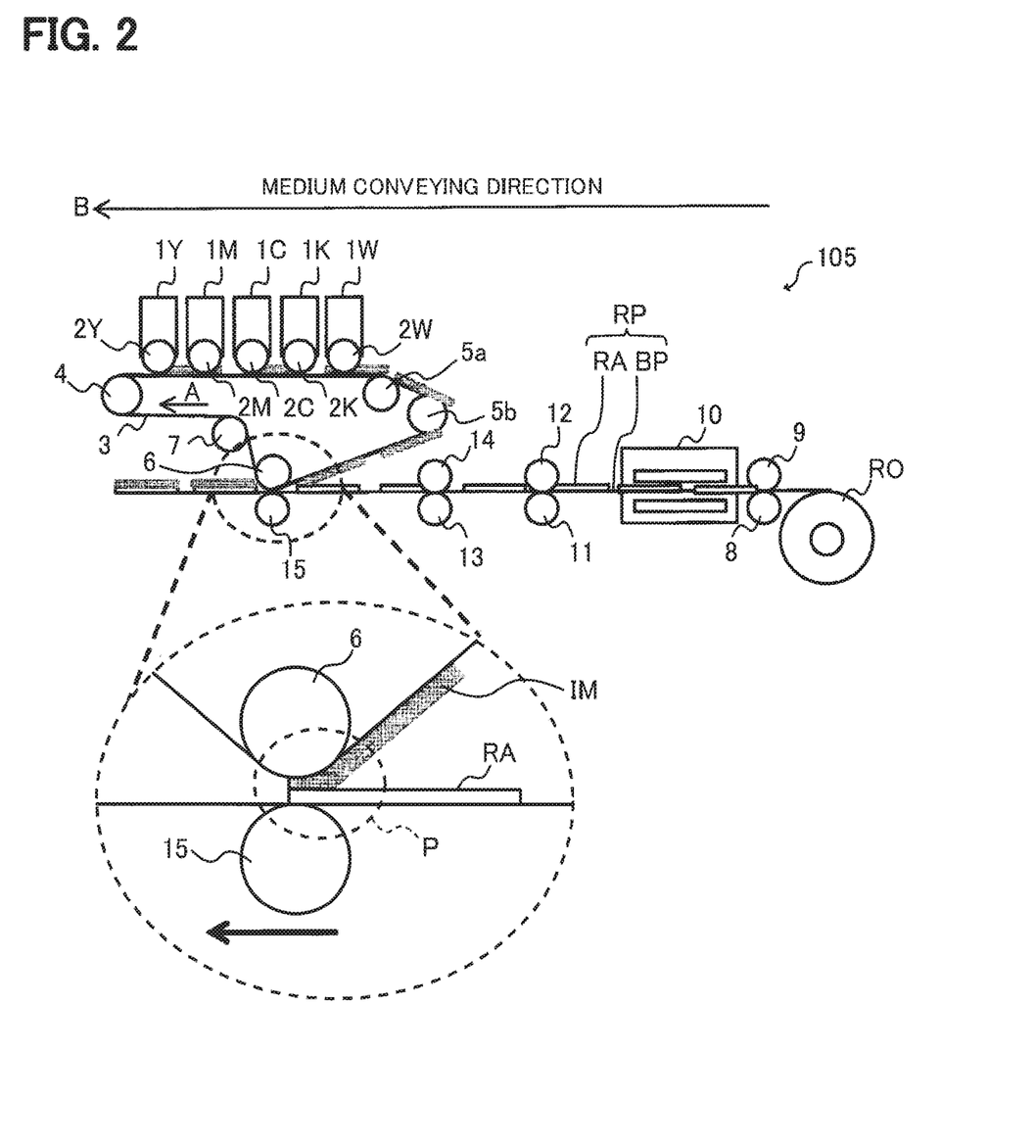
FIG. 2 is a schematic illustration representing an example of a printing unit.

FIG. 2 is a schematic illustration representing an example of the printing unit 105.

The case where the printing unit 105 prints on unprinted label roll paper RO wound as a continuous medium will be described in this embodiment.

The printing unit 105 includes five independent image forming units 1Y, 1M, 1C, 1K, and 1W, which contact with the surface of an intermediate transfer belt 3 and transfer respective toner images onto the intermediate transfer belt 3.

The image forming unit 1Y includes a photoreceptor 2Y, and forms a toner image of yellow (Y) on the photoreceptor 2Y. The image forming unit 1M includes a photoreceptor 2M, and forms a toner image of magenta (M) on the photoreceptor 2M. The image forming unit 1C includes a photoreceptor 2C, and forms a toner image of cyan (C) on the photoreceptor 2C. The image forming unit 1K includes a photoreceptor 2K, and forms a toner image of black (K) on the photoreceptor 2K. The image forming unit 1W includes a photoreceptor 2W, and forms a toner image of white (W) on the photoreceptor 2W.

The intermediate transfer belt 3 functioning as an intermediate transfer unit is looped around a driving roller 4, idle rollers 5a and 5b, a secondary transfer backup roller 6, and a tension roller 7. The intermediate transfer belt 3 is driven to rotate in a direction indicated by an arrow A in FIG. 2 by a motor (not illustrated) functioning as a drive source.

Although not illustrated, primary transfer rollers are disposed at positions opposite to the photoreceptors 2Y, 2M, 2C, 2K, and 2W across the intermediate transfer belt 3. The toner images formed on the photoreceptors 2Y, 2M, 2C, 2K, and 2W are transferred onto the intermediate transfer belt 3 by the primary transfer rollers (not illustrated). The intermediate transfer belt 3 holds toner images on its surface to convey them to secondary transfer positions.

The label roll paper RO is pinched by a sheet feed roller 8 and a pinch roller 9, and conveyed in a medium conveying direction indicated by an arrow B in FIG. 2.

The label roll paper RO is cut into a predetermined size by the cutter mechanism 10, and conveyed as label paper sheets RP.

The label paper sheet RP has a label RA pasted on a base sheet BP. A predetermined spacing is formed between the labels RA of adjacent label paper sheets RP. Only the base sheet BP is present between the labels RA. The cutter mechanism 10 cuts the base sheet BP between the labels RA.

The label paper sheet RP is pinched by a first intermediate conveying roller 11, and a first pinch roller 12 facing the first intermediate conveying roller 11, and is conveyed by the rotation of the first intermediate conveying roller 11.

The label paper sheet RP is further pinched by a second intermediate conveying roller 13, and a second pinch roller 14 facing the second intermediate conveying roller 13, and is conveyed by the rotation of the second intermediate conveying roller 13 to a secondary transfer position P formed by a secondary transfer roller 15 and the secondary transfer backup roller 6.

The secondary transfer roller 15 and the secondary transfer backup roller 6 which function as transfer means transfer a toner image IM onto the conveyed label paper sheet RP. The toner image IM is correctly transferred to a predetermined position of the label paper sheet RP by matching the time when the toner image IM is transferred on the label paper sheet RP with the time when the label RA and the toner image IM primarily transferred onto the intermediate transfer belt 3 reach the secondary transfer position P. The image pickup unit 117 is located downstream of the secondary transfer roller 15 in the conveying direction of the label paper sheet RP, and picks up images of the label RA on the label paper sheet RP, the base sheet BP, and the toner image formed by the toner transferred onto the label paper sheet RP.

It is desired to set the rotation speed of the intermediate transfer belt 3 different from the conveyance speed of the label paper sheet RP. For example, the speed of the intermediate transfer belt 3 is set higher by 0.26% than the circumferential speed of the second intermediate conveying roller 13 located upstream of the secondary transfer roller 15 in the conveying direction of the label paper sheet RP (Circumferential Speed of Second Intermediate Conveying Roller 13:Speed of Intermediate Transfer Belt 3=100: 100.26). This makes it easy to transfer the toner image onto the label paper sheet RP by the difference in speed between the intermediate transfer belt 3 and the label paper sheet RP at the secondary transfer position P, and it is, therefore, possible to reduce the amount of toner remaining on the intermediate transfer belt 3.

The label paper sheet RP on which the toner image IM transferred is further conveyed, heated and pressurized by the fixing device (not illustrated) to fix the toner image IM on the label paper sheet RP, and discharged out of the image forming apparatus 100.

In this case, the printing unit 105 uses an intermediate transfer method in which the toner images formed on the photoreceptors 2Y, 2M, 2C, 2K, and 2W are primarily transferred onto the intermediate transfer belt 3, and then secondarily transferred onto the medium, but the method used by the printing unit 105 is not limited to such a method. For example, the printing unit 105 may use a direct transfer method in which the toner images formed on the photoreceptors 2Y, 2M, 2C, 2K, and 2W are transferred onto the medium.

With reference to FIG. 1 again, the storage unit 106 stores information and programs required for processing in the image forming apparatus 100.

For example, the storage unit 106 stores gap information 107, medium setting information 108, density information 109, correction amount information 110, and history information 111.

The gap information 107 represents an inter-page gap as the gap between pages included in setting information acquired from the host device (not illustrated).

The medium setting information 108 represents attributes of a medium, such as the length, the width, the thickness, and the type of the medium included in the setting information.

The density information 109 represents a density calculated by the development unit 112.

The correction amount information 110 represents an amount of correction specified by the development unit 112.

The history information 111 represents a history of items each of which associates medium information, a density, and a total shift amount. Items each of which associates medium information, a density, and a total shift amount, specified by an experiment or the like in advance, are desirably registered in the history information 111 so that a printing shift can be corrected even immediately after setting up the image forming apparatus 100. Immediately after setting up the image forming apparatus 100, printing may be performed upon setting of the amount of correction to a predetermined value, for example, zero dots, until a certain number of items are registered in the history information 111.

Figure 3:
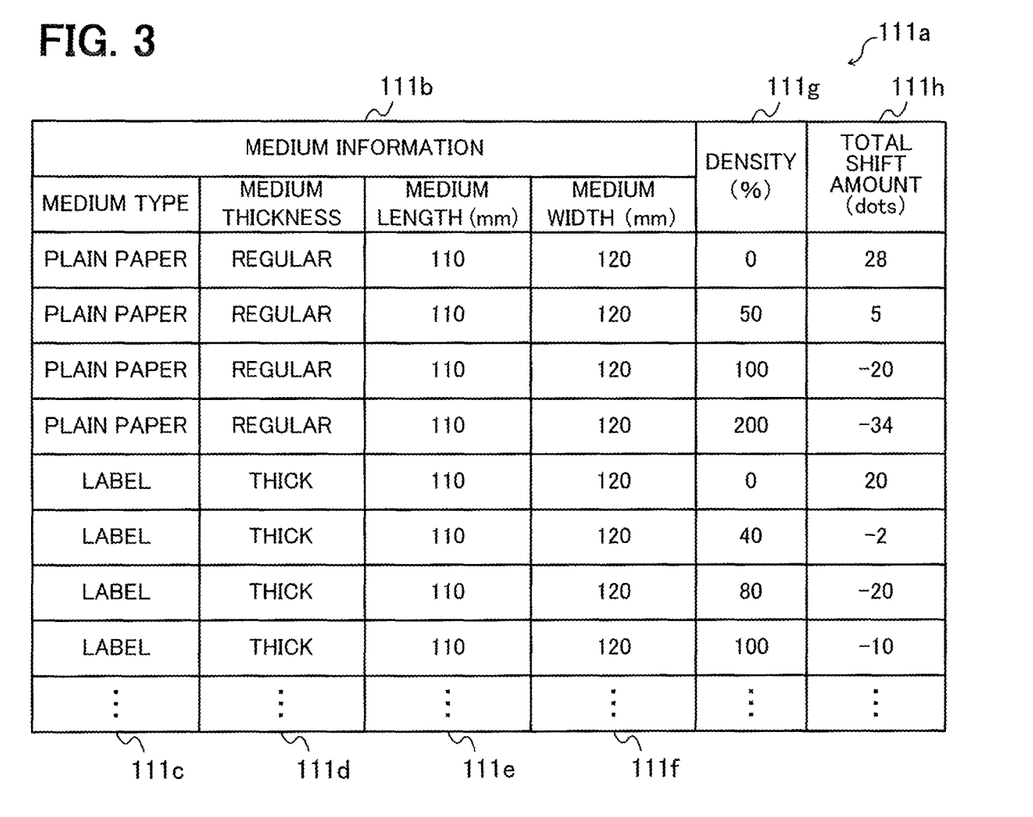
FIG. 3 is a schematic illustration representing an example of history information.

FIG. 3 is a schematic illustration representing an example of the history information 111.

The example of the history information 111 is a history table 111a including a Medium Information column 111b, a Density column 111g, and a Total Shift Amount column 111h.

The Medium Information column 111b includes a Medium Type column 111c, a Medium Thickness column 111d, a Medium Length column 111e, and a Medium Width column 111f, and stores medium information representing attributes of a medium.

The Medium Type column 111c stores medium type information representing the type of medium to be printed.

The Medium Thickness column 111d stores medium thickness information representing the thickness of the medium to be printed.

The Medium Length column 111e stores medium length information representing the length of the medium to be printed.

The Medium Width column 111f stores medium width information representing the width of the medium to be printed.

The Density column 111g stores a density calculated by the development unit 112 as will be described later.

The Total Shift Amount 111h stores a total shift amount calculated by the development unit 112 as will be described later. As for the total shift amount, the shift amount in the same direction as the medium conveying direction is defined to be positive, and the shift amount in a direction opposite to the medium conveying direction is defined to be negative.

As described above, the history information 111 includes a plurality of items (records), and each of the items associates attributes of a medium, a density, and a total shift amount.

With reference to FIG. 1 again, the development unit 112 generates image data as a bitmap from the edited print data, calculates a density of an image represented by the image data, and corrects a shift in forming an image on the medium in accordance with the calculated density.

The development unit 112 includes a development execution unit 113, a density calculation unit 114, and a correction unit 115.

The development execution unit 113 generates image data as a bitmap from the edited print data. Therefore, the editing unit 102 and the development execution unit 113 constitute a generation unit to generate image data, based on the print data.

The density calculation unit 114 calculates a density of the generated image data. For example, the density calculation unit 114 calculates a density as a ratio at which a developer (toner) is to be adhered according to the generated image data. More specifically, when the development execution unit 113 generates the image data, the density calculation unit 114 counts the number of pixels to be formed as an image, and calculates a density in accordance with the ratio of the counted number of pixels to the total number of pixels included in one page. In this case, the density is defined as a ratio at which an image is formed on one page, based on the generated image data.

The correction unit 115 corrects a shift of the image to be formed on the medium, in accordance with the density calculated by the density calculation unit 114. For example, the correction unit 115 specifies an amount of correction corresponding to the density calculated by the density calculation unit 114, and corrects a shift of the image by using the specified amount of correction. In this case, the correction unit 115 changes the amount of correction in accordance with the density. More specifically, the correction unit 115 corrects the shift by changing the position (the image forming position or the printing position) to form an image on the medium. In this case, the correction unit 115 need only change the position to form an image on the medium, by widening or narrowing the inter-page gap, based on the amount of correction.

More specifically, when a total shift amount corresponding to the density calculated by the density calculation unit 114 and the attributes of the medium represented by the setting information is included in the history information 111 stored in the storage unit 106, the correction unit 115 specifies an amount of correction by using the total shift amount.

When the corresponding total shift amount is not included in the history information 111, the correction unit 115 estimates an amount of correction corresponding to the density calculated by the density calculation unit 114, from a plurality of total shift amounts included in the setting information. For example, the correction unit 115 may specify, as an amount of correction, a value calculated by interpolation or extrapolation from the total shift amounts corresponding to the attributes of the medium represented by the setting information. In this case, the correction unit 115 may calculate an amount of correction by interpolation or extrapolation, by selecting a total shift amount for a density in the neighborhood of the density calculated by the density calculation unit 114, from the total shift amounts corresponding to the attributes of the medium represented by the setting information.

The image transfer unit 116 controls the stop or restart of strobe or DMA (Direct Memory Access) transfer, to print, on the medium, the image data generated as a bitmap by the development unit 112.

The image pickup unit 117 picks up an image of the medium printed by the printing unit 105 to generate picked-up-image data of the picked-up image.

Figure 4A:
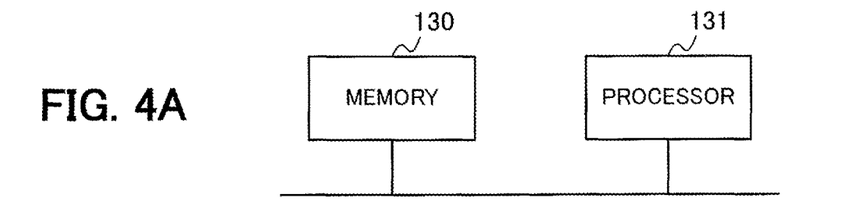
FIGS. 4A and 4B are schematic diagrams illustrating hardware configuration examples.

Part or the whole of the editing unit 102, the main control unit 103, the mechanism control unit 104, the development unit 112, and the image transfer unit 116 described above can be implemented by, for example, a memory 130, and a processor 131 such as a CPU (Central Processing Unit) that executes a program stored in the memory 130, as illustrated in FIG. 4A. The program may be provided via a network or in the form of a recording medium recording the program. In other words, the program may be provided as, for example, a program product.

Figure 4B:
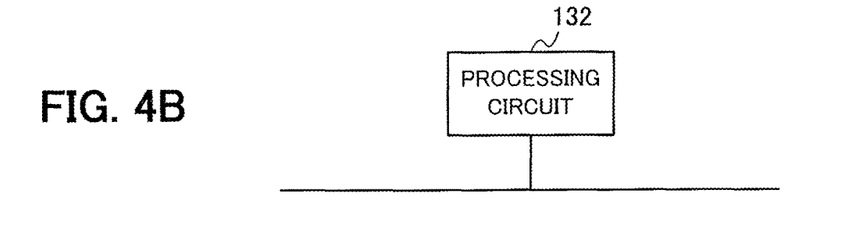

Part or the whole of the editing unit 102, the main control unit 103, the mechanism control unit 104, the development unit 112, and the image transfer unit 116 can also be implemented by, for example, a processing circuit 132 such as a single circuit, a complex circuit, a programmed processor, a parallel-programmed processor, ASICs (Application Specific Integrated Circuits), or an FPGA (Field Programmable Gate Array), as illustrated in FIG. 4B.

The storage unit 106 can be implemented by a storage device such as a volatile memory or a nonvolatile memory.

The communication unit 101 can be implemented by a communication device such as an NIC (Network Interface Card).

A printing shift will be described below with reference to FIGS. 2, 5, and 6.

Figure 5A:
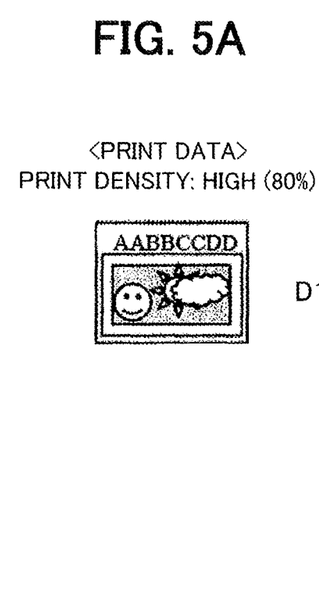
FIGS. 5A to 5C are schematic illustrations for explaining a position shift when the density is high.

FIG. 5A is a schematic illustration representing a first example of an image represented by print data.

It is assumed that the image illustrated in FIG. 5A has a high density of 80%.

Figure 5B:
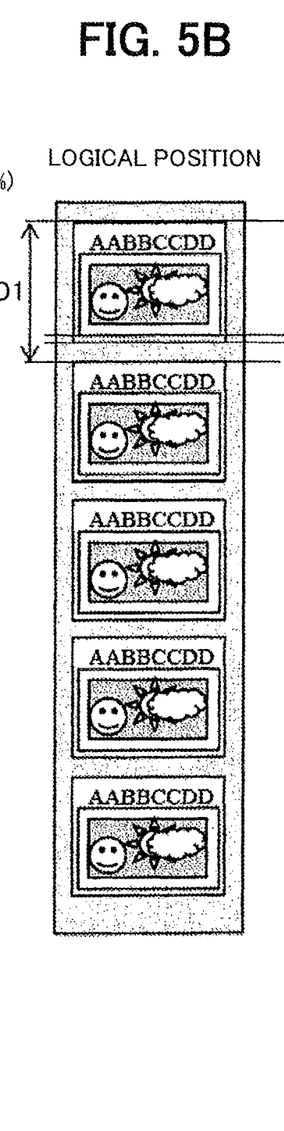

The image illustrated in FIG. 5A is, for example, set to be printed at a position illustrated in FIG. 5B, in the print data.

However, when the density is high, sliding occurs between the medium and the secondary transfer roller 15 due to the presence of toner at the secondary transfer position P formed by the secondary transfer roller 15 and the secondary transfer backup roller 6, illustrated in FIG. 2.

Figure 5C:
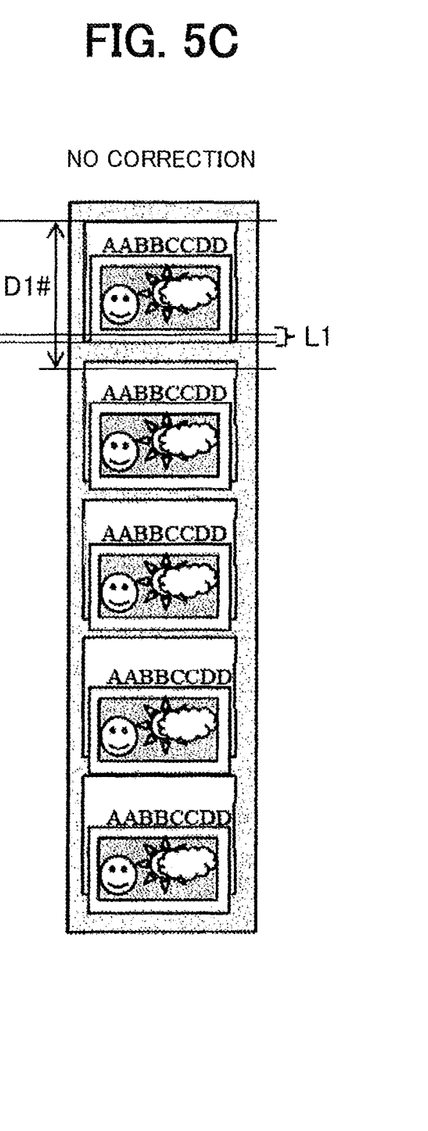

When this occurs, as illustrated in FIG. 5C, the printed image stretches in a direction opposite to the sheet conveying direction and becomes longer by a length L1. Therefore, an interval D1 between labels represented by the print data illustrated in FIG. 5B also changes to an interval D1# illustrated in FIG. 5C, and the printing position on the next label paper sheet RP shifts as well.

Figure 6A:
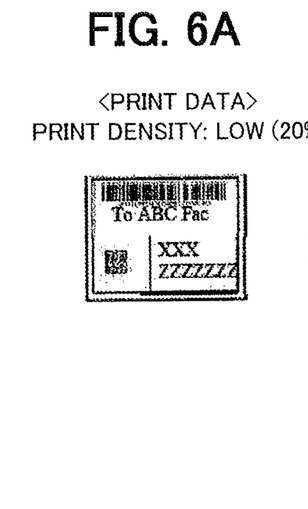
FIGS. 6A to 6C are schematic illustrations for explaining a position shift when the density is low.

FIG. 6A is a schematic illustration representing a second example of the image represented by the print data.

The image illustrated in FIG. 6A has a low density of 20%.

Figure 6B:
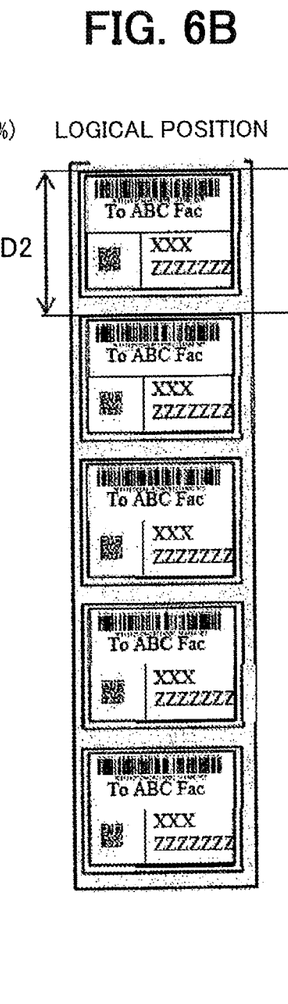

The image illustrated in FIG. 6A is, for example, set to be printed at a position illustrated in FIG. 6B, in the print data.

However, when the density is low, the friction between the medium and the secondary transfer roller 15 is strong at the secondary transfer position P formed by the secondary transfer roller 15 and the secondary transfer backup roller 6, illustrated in FIG. 2, the force to feed the medium, in turn, is strong, and the medium is pulled by the secondary transfer roller 15 and the secondary transfer backup roller 6.

Figure 6C:
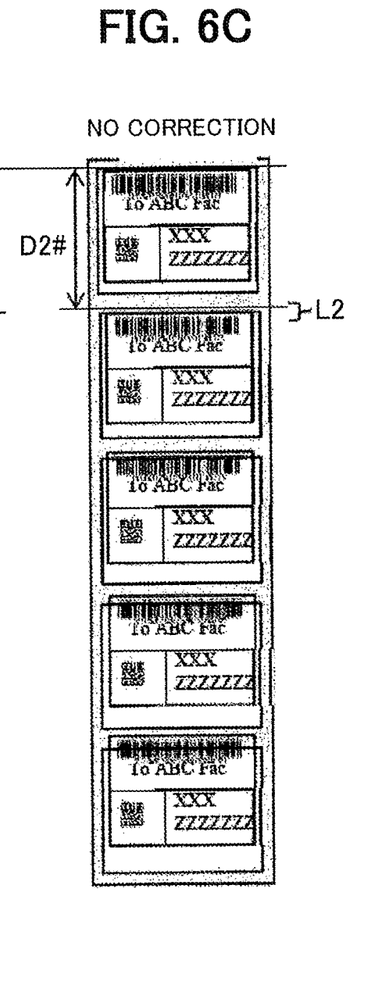

When this occurs, as illustrated in FIG. 6C, the printed image is pulled in the sheet conveying direction and becomes shorter by a length L2. Therefore, an interval D2 between labels represented by the print data illustrated in FIG. 6B also changes to an interval D2# illustrated in FIG. 6C, and the printing position on the next label paper sheet RP shifts as well.

In this embodiment, an image is printed at an accurate position by correcting a shift related to the density as mentioned above. As described with reference to FIGS. 5 and 6, the higher the density is, the larger the length of the image becomes, and the lower the density is, the smaller the length of the image becomes, therefore, the absolute value of the amount of correction to correct a shift related to the density becomes larger as the density deviates more from a predetermined value.

Figure 7:
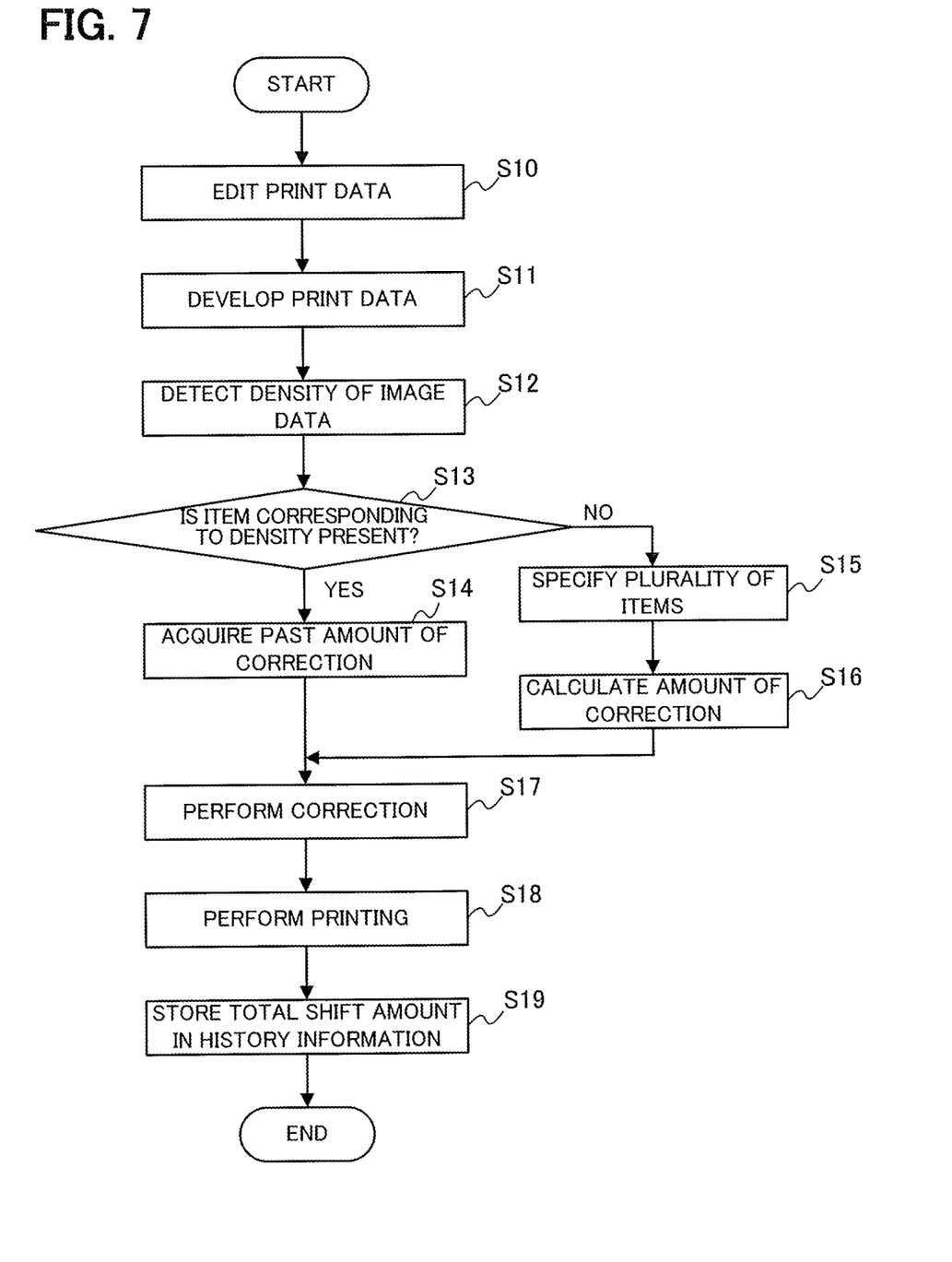
FIG. 7 is a flowchart illustrating an operation of the image forming apparatus.

FIG. 7 is a flowchart illustrating an operation of the image forming apparatus 100.

The flowchart illustrated in FIG. 7 is started when the communication unit 101 receives print data from the host device (not illustrated).

The communication unit 101 provides the received print data to the editing unit 102 and the editing unit 102 edits the print data to generate edited print data representing an image for each page (S10). The edited print data is transmitted to the development unit 112 via the main control unit 103. The editing unit 102 stores, in the storage unit 106, medium setting information 108 representing attributes of a medium included in setting information acquired from the host device.

In the development unit 112, the development execution unit 113 develops the images represented by the edited print data into image data as a bitmap (S11).

The density calculation unit 114 calculates a density, based on the image data (S12). The density calculation unit 114 stores, in the storage unit 106, density information 109 representing the calculated density.

The correction unit 115 determines, from the history information 111 stored in the storage unit 106, whether an item corresponding to the density calculated by the density calculation unit 114 and the attributes of the medium represented by the setting information is present (S13). If the item is present (Yes in step S13), the process advances to step S14; if the item is not present (No in step S13), the process advances to step S15.

In step S14, the correction unit 115 acquires a total shift amount from the corresponding item in the history information 111, and specifies the acquired total shift amount as an amount of correction. When a plurality of corresponding items are present, the correction unit 115 calculates an average of a plurality of total shift amounts stored in the corresponding items, and specifies the average as the amount of correction. The correction unit 115 stores, in the storage unit 106, correction amount information 110 representing the specified amount of correction.

In step S15, the correction unit 115 specifies a plurality of items corresponding to medium setting for the print data, in the history information 111.

The correction unit 115 acquires densities and total shift amounts from the specified items, and calculates a linear expression of an approximate line from the acquired densities and total shift amounts. The correction unit 115 specifies a total shift amount corresponding to the density calculated by the density calculation unit 114, from the linear expression as an amount of correction (S16). The correction unit 115 stores, in the storage unit 106, correction amount information 110 representing the specified amount of correction.

The correction unit 115 corrects the shift by using the specified amount of correction, by adjusting the gap spacing between pages (S17). In this case, the correction unit 115 may add the specified amount of correction to the gap spacing. The correction unit 115 stores, in the storage unit 106, gap information 107 representing the corrected gap spacing.

The image transfer unit 116 transfers the image data, the gap information 107, and the medium setting information 108 to the printing unit 105, and then the printing unit 105 performs printing based on these pieces of information (S18).

The image pickup unit 117 picks up an image of the label paper sheet RP as a printing result, and transmits picked-up-image data representing the picked-up image to the main control unit 103. The main control unit 103 detects a shift amount of the image in the medium conveying direction, based on the picked-up image represented by the picked-up-image data. The main control unit 103 calculates a total shift amount from the detected shift amount and the amount of correction represented by the correction amount information 110, and adds, to the history information 111, a new item representing the medium setting information 108, the density information 109, and the calculated total shift amount (S19).

As described above, according to this embodiment, since an amount of correction can be specified from the density of the print data, a slight shift of the printing position due to a difference in density can be corrected, and the printing position accuracy can thus be improved.

In the above-described embodiment, a total shift amount is associated with attributes of a medium and a density in the history information 111, but this embodiment is not limited to such an example. When, for example, a medium to be printed is fixed, a density and a total shift amount may be associated with each other in the history information 111. In this case, an amount of correction can be specified in accordance with the density.

In the above-described embodiment, the correction unit 115 corrects the shift by changing the gap spacing that is the inter-page gap, but this embodiment is not limited to such an example. For example, the correction unit 115 may correct the shift by stretching and shrinking the image represented by the image data. More specifically, the correction unit 115 may shrink the image by the absolute value of the specified amount of correction when this amount of correction is negative, and stretch the image by the absolute value of the specified amount of correction when this amount of correction is positive.

In the above-described embodiment, although the color of the image data is not taken into consideration, since properties such as friction vary for each toner color, the density calculation unit 114 may calculate a density for each color, correct the calculated densities by using a factor (weighting value) determined in advance for each color, and sum the corrected densities, to specify an amount of correction in accordance with the calculated sum density.

In the above-described embodiment, the case where printing is performed on the label roll paper RO has been described, but this embodiment is not limited to such a case. For example, the above-mentioned correction is also applicable to plain paper or continuous paper.

In the above-described embodiment, an example in which the image pickup unit 117 is located downstream of the secondary transfer roller 15 in the conveying direction of the label paper sheet RP has been given, but an optical transmission sensor or a reflection sensor may be provided upstream of the secondary transfer roller 15 in the conveying direction of the label paper sheet RP, in place of the image pickup unit 117, and the base sheet BP and the label RA on the label paper sheet RP may be detected. In this case, since the intermediate transfer belt 3 is driven by using the driving roller 4 on the interior of the intermediate transfer belt 3, free from contact with toner, and the conveyance speed and distance of the intermediate transfer belt 3 can be regarded as constant, the toner image may be regarded as moving at a conveyance speed measured in advance, and an image shift (position shift) may be corrected based on the detection result obtained by the optical transmission sensor or the reflection sensor.

DESCRIPTION OF REFERENCE CHARACTERS 100 image forming apparatus; 101 communication unit; 102 editing unit; 103 main control unit; 104 mechanism control unit; 105 printing unit; 106 storage unit; 112 development unit; 113 development execution unit; 114 density calculation unit; 115 correction unit; 116 image transfer unit; 117 image pickup unit; 118 total shift calculation unit.

What is claimed is:

1. An image forming apparatus comprising:
a communication unit to receive image forming data;
a development unit to generate image data as a bitmap based on the image forming data;
an image transfer unit to control transfer of the image data for forming an image on a medium; and
an image forming unit to form the image on the medium in accordance with the image data transferred by the image transfer unit, wherein
the image forming unit includes an intermediate transfer unit to hold a developer image corresponding to the image and a roller that is located, in a conveying direction of the medium, upstream of a transfer position where the developer image is to be transferred from the intermediate transfer unit to the medium;
a circumferential speed of the roller is set lower than a rotation speed of the intermediate transfer unit; and
the development unit includes a development execution unit to generate the image data from the image forming data, a calculation unit to calculate a ratio at which a developer is to be adhered in accordance with the image data, and a correction unit to correct a shift of the image to be formed on the medium by using an amount of correction, the amount of correction being changed in accordance with the calculated ratio.

2. The image forming apparatus according to claim 1, wherein
the calculation unit is a density calculation unit to calculate a density of the image as the ratio; and
the correction unit specifies the amount of correction corresponding to the calculated density.

3. The image forming apparatus according to claim 2, wherein an absolute value of the amount of correction becomes larger as the density deviates more from a predetermined value.

4. The image forming apparatus according to claim 2, further comprising a storage unit to store history information including a plurality of items, each of the plurality of items associating an attribute of a medium, a density, and a total shift amount,
wherein the communication unit further acquires setting information representing the attribute of the medium on which the image represented by the image forming data is to be formed, and
the correction unit specifies the total shift amount corresponding to the calculated density and the attribute represented by the setting information, by referring to the history information, and specifies the specified total shift amount as the amount of correction.

5. The image forming apparatus according to claim 4, wherein when a plurality of the total shift amounts corresponding to the calculated density and the attribute represented by the setting information are recorded in the history information, the correction unit specifies an average of the total shift amounts as the amount of correction.

6. The image forming apparatus according to claim 4, wherein when the total shift amount corresponding to the calculated density and the attribute represented by the setting information is not recorded in the history information, the correction unit specifies, as the amount of correction, a value estimated from a plurality of the total shift amounts recorded in the history information.

7. The image forming apparatus according to claim 4, further comprising a total shift calculation unit to detect a shift amount with which the image is formed on the medium, from the medium on which the image is formed, to calculate a total shift amount by using the detected shift amount and the amount of correction used in forming the image on the medium, and to add a new item including the calculated total shift amount to the history information.

8. The image forming apparatus according to claim 1, wherein the correction unit corrects the shift by changing a position to form the image on the medium.

9. The image forming apparatus according to claim 1, wherein the correction unit corrects the shift by stretching or shrinking the image represented by the image forming data.

10. An image forming method comprising:

receiving image forming data;

generating image data as a bitmap based on the image forming data;

generating image data as a bitmap from the image forming data;

calculating a ratio at which a developer is to be adhered in accordance with the image data;

correcting a shift of the image to be formed on a medium by using an amount of correction, the amount of correction being changed in accordance with the calculated ratio;

controlling transfer of the image data for forming an image on the medium;

forming a developer image corresponding to the image;

holding the developer image to convey the developer image to a transfer position where the developer image is to be transferred to the medium;

conveying the medium to the transfer position, conveying speed of the medium being set lower than conveying speed of the developer image; and transferring the developer image to the medium at the transfer position.

* * * * *